UNITED STATES PATENT OFFICE.

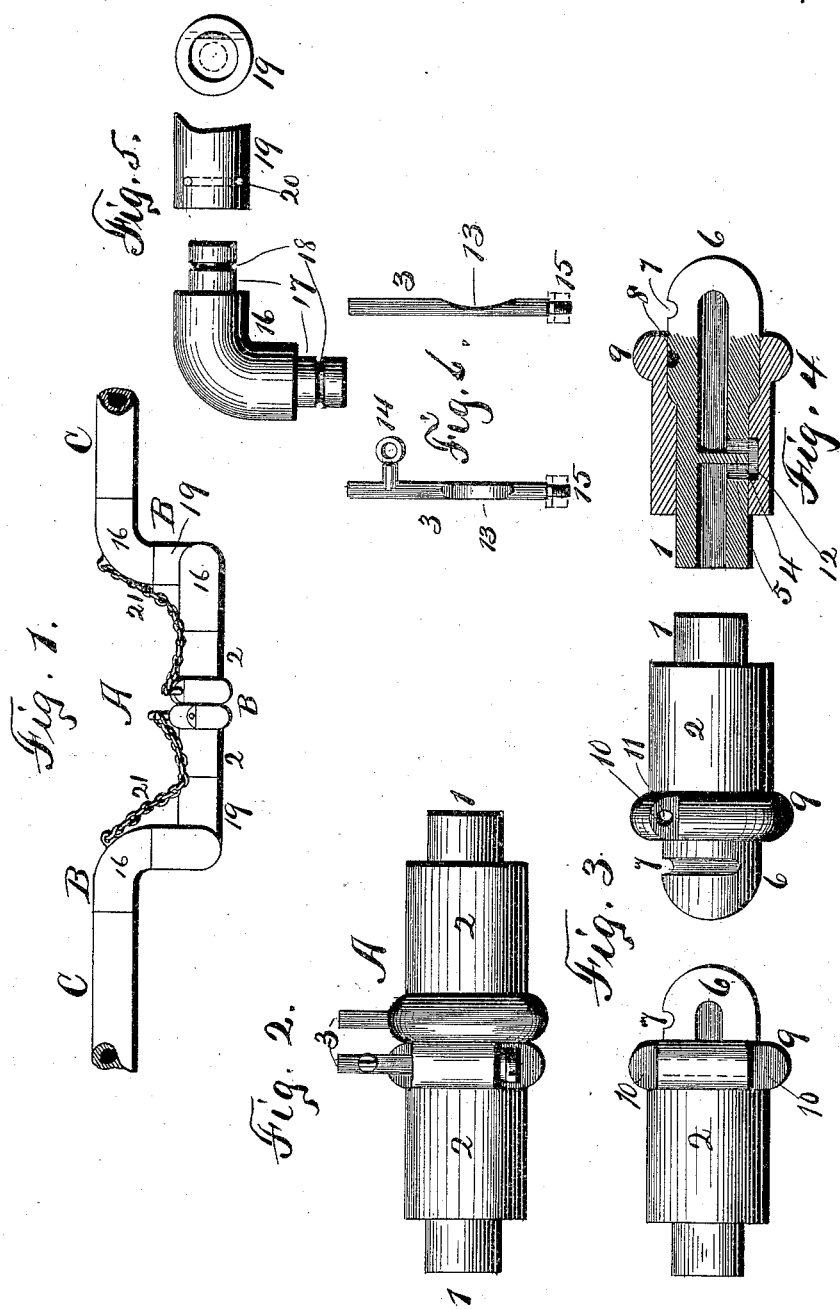

ALVAH SWEETLAND, OF MEMPHIS, NEW YORK.

COUPLER.

SPECIFICATION forming part of Letters Patent No. 423,093, dated March 11, 1890.

Application filed December 14, 1889. Serial No. 333,786. (No model.)

*To all whom it may concern:*

Be it known that I, ALVAH SWEETLAND, of Memphis, in the county of Onondaga, in the State of New York, have invented new and useful Improvements in Couplers, of which the following, taken in connection with the accompanying drawings, is a full, clear, and exact description.

My invention relates to couplings for either stiff or flexible pipes for conducting steam, hot air, gas, or all kinds of liquids, and more particularly to those which comprise a coupling and an intermediate connection between it and the pipe or hose, consisting of multiple elbows coupled together and in which the flow is stopped automatically when the coupling-sections are uncoupled.

My object is to produce a coupling in which the sections are locked together by the partial rotation of sleeves on the sections; in which the flow of steam, gas, or liquid is cut off automatically by the act of uncoupling the sections; in which each coupling-section is connected to the pipe or hose by flexible and hollow or tubular connections, consisting of multiple elbows connected together by swivel-joints; in which the one section is locked into the sleeve around the other by means of a groove and pin-lock, and in which the sections are unlocked by hand by twisting one sleeve around automatically by twisting the locking-pin around whenever the flexible joint draws down toward a horizontal by means of a chain or cord connected at one end to an arm on the pin and at the other to the upper elbow of the flexible connection.

My invention consists in the several novel features of construction and operation which are hereinafter fully described, and which are specifically set forth in the claims hereto annexed.

It is constructed as follows, reference being had to the accompanying drawings, in which—

Figure 1 is a side elevation of the coupling complete and connecting pieces of pipe or hose. Fig. 2 is a top plan of the coupling proper, showing the sections, sleeves, and locking-pins in the position assumed by them when the sections are coupled and locked. Fig. 3 is a side elevation of the sleeves and coupling-sections disconnected or uncoupled, with the pins removed. Fig. 4 is a longitudinal vertical section of one of the coupling-sections and sleeve, showing the ports for the passage of the steam or liquid through the wall of the coupling-section and along the inner wall of the sleeve to pass around the partition in the section. Fig. 5 is an elevation of an elbow in the connection between the coupling-section and the pipe or hose, showing part of one of the sleeves in side elevation and in end elevation. Fig. 6 shows two views of the locking-pin—viz., a front and a side elevation.

A is the coupling proper, consisting of two coupler-sections 1, of two sleeves 2, and of two locking-pins 3.

The coupler-sections 1 consist each of a tubular body provided with ports 4, one on either side of the partition 5, which otherwise closes the hole through the section. Each section is scarfed off on its inner end at any desired angle, creating a head 6, and 7 is a groove in the periphery of the head, extending part way around it, and 8 is another peripheral groove parallel with the groove 7. That portion constituting the head is larger than the body, about as shown in the drawings.

The sleeves 2 consist each of a tubular body the bore of which receives the body and part of the head of the coupler, and having upon the inner end an external and peripheral enlargement or shoulder 9, provided with notches 10, and 11 is a pin-hole through the shoulders between the notches, this hole cutting into the enlargement of the bore of the sleeve, and in the bore I make a recess 12, which coincides with the ports 4 when the sections are coupled.

The locking-pins consist each of a cylindrical body concaved on one side, as at 13, concentric with the periphery of the head of a coupler-section, with an arm and eye 14 near the top, and with the threaded tenon and nut 15 upon the other end.

B is the flexible hollow or tubular connection between each coupling-section and the pipe or hose C, consisting of multiple elbows 16, provided upon each end with a stem 17, provided with a peripheral groove 18, and further consisting in sleeves 19, bored to receive the stems 17, and either with or without a middle partition bored of the same size as the bore of the stem, and each sleeve is provided with a transverse pin-hole 20; opening into the bore of the sleeve in such manner that when the pin is inserted it will fit partly in the groove 18 in the stem 17 and partly in the sleeve and create a pin and groove or swivel-joint between that end of the elbow and the sleeve, and when a number of elbows and sleeves are thus connected together permitting of great flexibility of movement of the coupling-connection whichever way the pipe swings or is vibrated or shaken, thus taking up all of the vertical and lateral motion of a railway-car.

A cord or chain 21, connected at one end to an eye in an upper elbow and at the other to the eye 14, operates to partially rotate the locking-pin 3 when the direct strain upon the pipe or hose draws the chain-elbow down toward a horizontal. The coupling-pins 3, when inserted into the holes 11, lie partly therein and partly in the grooves 8 in the coupling-sections, and so that when so inserted and holding the sections in the sleeves when the heads 6 are placed together face to face and pushed together, the point of the head of one will enter the opposite sleeve far enough, so that the groove 7 will be contiguous to the pin 3 in that sleeve, and then when the sleeves are twisted the body of the pin will enter the groove, and thus lock each coupling-section to the opposite sleeve, locking both of the sections and the sleeves tightly together. When so locked, the ports 4 and recess 12 coincide, permitting free passage of the steam, gas, or liquid through each section around the partition 5. The outer ends of the coupling-sections are secured to or into the contiguous elbow or sleeve of the flexible connection by a pin-and-groove joint, as shown in Fig. 5, or by any kind of rigid joint. When so coupled together, if I wish to uncouple them I can do so by simply twisting the sleeves back until the lock-pins are disengaged from the grooves 7, when the sections readily separate from the sleeves, and this backward twisting of the sleeves moves the recess 12 away from the ports, and thus cuts off the flow of steam, gas, or liquid. When connected to the steam or other pipes used to heat a railway-train and the cars are uncoupled and drawn apart, the flexible connections are drawn down toward a horizontal, and thus draw the chains tight, and thus partially rotate the pins 3 until the body of each pin is turned out from the groove, the concave 13 coming over the groove, and thus the sections are released.

What I claim as my invention, and desire to secure by Letters Patent, is—

1. A hose-coupling comprising tubular sections scarfed off at their meeting ends and provided with peripheral grooves 7 and 8, sleeves fitting over the sections and having notched shoulders on their inner ends, and locking-pins inserted through said shoulders and engaging with the grooves in the sections, as set forth.

2. A hose-coupling comprising tubular sections scarfed off at their meeting ends and provided with peripheral grooves 7 and 8 and with a partition across the bore, and ports on either side of the partition opening out through the side of each section, sleeves fitting over the sections and provided with an internal recess coinciding with said ports when the sections are coupled, and having notched shoulders on their inner ends, and locking-pins inserted through said shoulders and engaging with the grooves in the sections, as set forth.

3. A flexible connection between a pipe or hose and a coupling, consisting of multiple tubular elbows having projecting stems, each provided with a peripheral groove and multiple tubular sleeves adapted to receive said stems, and connecting-pins inserted transversely through the sleeves and engaging with the grooves in the elbow-stems, as set forth.

4. A flexible connection between a pipe or hose and a coupling, comprising multiple tubular elbows provided with tubular stems projecting from the ends of each elbow, and multiple tubular sleeves fitting over the stems and connected thereto by a swivel-joint, consisting of a pin through the sleeve engaging with a peripheral groove in the stem, and means for securing the connection to the hose or pipe and to the coupling-section, as described.

5. A hose-coupling comprising sections scarfed off at their meeting ends and provided with peripheral grooves 7 and 8 and with a partition across the bore and port on either side of the partition opening outward through the side of each section, sleeves fitting over the coupling-sections and provided with an internal recess coinciding with said ports when the sections are coupled and having notched shoulders on their inner ends, and locking-pins concaved on one side centrally and inserted through said shoulders and engaging with a groove in the coupling-section, as set forth.

6. The combination, with a flexible connection between the pipes or hose, consisting of multiple tubular elbows provided with tubular stems on their extremities and multiple tubular sleeves fitting over the stems and connected thereto by swivel-joint, and a hose-coupling consisting of tubular sections scarfed off on their meeting ends and provided with peripheral grooves on their heads, sleeves fitting over the sections, and locking-pins provided with side arms and fitting through the sleeves and engaging with the grooves in the heads of the coupling-sections, of a chain connected at one end to an upper elbow of the connection and at the other to the arms of the locking-pins, as set forth.

7. The combination, with the tubular coupling-sections enlarged and scarfed off at their inner ends and provided with peripheral grooves, of tubular sleeves shouldered inwardly and fitting over the body and head and rotating thereon to bring a pin through one sleeve into engagement with a groove in the head of the opposite coupling-section and pins through the sleeves, as set forth.

In witness whereof I have hereunto set my hand this 12th day of December, 1889.

ALVAH SWEETLAND.

In presence of—
H. P. DENISON,
F. T. DENISON.